United States Patent [19]

Mori et al.

[11] Patent Number: 5,299,060
[45] Date of Patent: Mar. 29, 1994

[54] MIRROR DEVICE INCLUDING AN ELASTIC SEAL MEMBER AND A VIBRATOR FOR AN AUTOMOBILE

[75] Inventors: Keiji Mori, Kariya; Naofumi Fujie, Nagoya; Koji Ito, Kariya; Kato Katsutoshi, Ama, all of Japan

[73] Assignee: Aisin Seiki Kabushiki Kaisha, Kariya, Japan

[21] Appl. No.: 673,983

[22] Filed: Mar. 25, 1991

[30] Foreign Application Priority Data

Mar. 29, 1990 [JP] Japan .................. 2-82458

[51] Int. Cl.⁵ .................. B60R 1/06; G02B 5/08; G02B 7/18
[52] U.S. Cl. .................. 359/514; 359/507
[58] Field of Search .................. 359/507, 512, 514

[56] References Cited

U.S. PATENT DOCUMENTS

| 4,929,072 | 5/1990 | Fujie et al. | 359/507 |
| 5,132,840 | 7/1992 | Okada et al. | 359/507 |
| 5,148,312 | 9/1992 | Kawai et al. | 359/507 |
| 5,155,625 | 10/1992 | Komatsu et al. | 359/507 |

FOREIGN PATENT DOCUMENTS

| 2362191 | 6/1975 | Fed. Rep. of Germany | 359/513 |
| 3049169 | 7/1982 | France | 359/513 |
| 2-41950 | 2/1990 | Japan . | |
| 2054329 | 2/1981 | United Kingdom | 359/507 |

*Primary Examiner*—Jon W. Henry
*Attorney, Agent, or Firm*—Finnegan, Henderson, Farabow, Garrett and Dunner

[57] ABSTRACT

A mirror device for an automobile includes a mirror member. A seal member is vibratably held to an outer circumference portion of the mirror member. A holder member is held to the seal member, is positiond at a reverse side of the mirror member and is vibratably held to the mirror member through the seal member. A vibrator is served for vibrating the mirror member.

6 Claims, 6 Drawing Sheets

MIRROR DEVICE INCLUDING AN ELASTIC SEAL MEMBER AND A VIBRATOR FOR AN AUTOMOBILE

BACKGROUND OF THE INVENTION

1. Field of the Invention

This invention relates to a mirror device for an automobile; and more particularly; to the mirror device which has a cleaning apparatus for removing water drops from a front surface of a mirror member.

2. Description of the Prior Art

A conventional mirror device for an automobile is disclosed in Japanese Patent Laid Open Publication No. 2 (1990)-41950 published without examination on Feb. 13, 1990 (shown in FIG. 10).

A mirror 1 is positioned at a front side of a holder 2. A hook 3 is formed as part of the holder 2. The hook 3 engages a front surface 1a of the mirror 1. An elastic member 4 is arranged between a back surface 1b of the mirror 1 and the holder 2. The elastic member 4 presses against the mirror 1. As a result, the mirror 1 is vibratably held to the holder 2 at an outer circumferential portion of mirror 1 by the hook 3 and the elastic member 4. A vibrator 5 is fixed against the back surface 1b of the mirror 1. When the vibrator 5 operates, the vibration of the vibrator 5 is transmitted to the mirror 1. Thus, the mirror 1 vibrates. Therefore, water drops on the front surface 1a of the mirror 1 are removed from the front surface 1a of the mirror 1 by misting and dropping out of the water drops.

The prior art of FIG. 10 has drawbacks, in that a: gap forms between the hook 3 and the front surface 1a of the mirror 1 because of manufacturing tolerances, there is strain on the holder 2. Also because of design parameters produced by the mirror 1 and holder 2, the curvature value of the mirror 1 does not agree with a curvature value of the holder 2. As a result, the water drops which drop off the front surface 1a of the mirror 1 by initial vibration of the mirror 1 gather in the gap. The water drops which gather in the gap are then transferred again to the front surface 1a of the mirror 1 by additional vibration of the mirror 1.

OBJECT AND SUMMARY OF THE PRESENT INVENTION

It is an object of the present invention to provide a mirror device for an automobile which prevents a re-adhesion of water drops.

In order to accomplish the object, the present invention provides a mirror device in which a mirror member is vibratably held to a holder member through a sealing member.

BRIEF DESCRIPTION OF THE DRAWINGS

These and other objects, features and advantages of the present invention will become more apparent on reading the following detailed description with reference to the accompanying drawings, wherein like members bear like reference numerals, and wherein.

DETAILED DESCRIPTION OF THE PREFERRED EMBODIMENT

Figure 1:
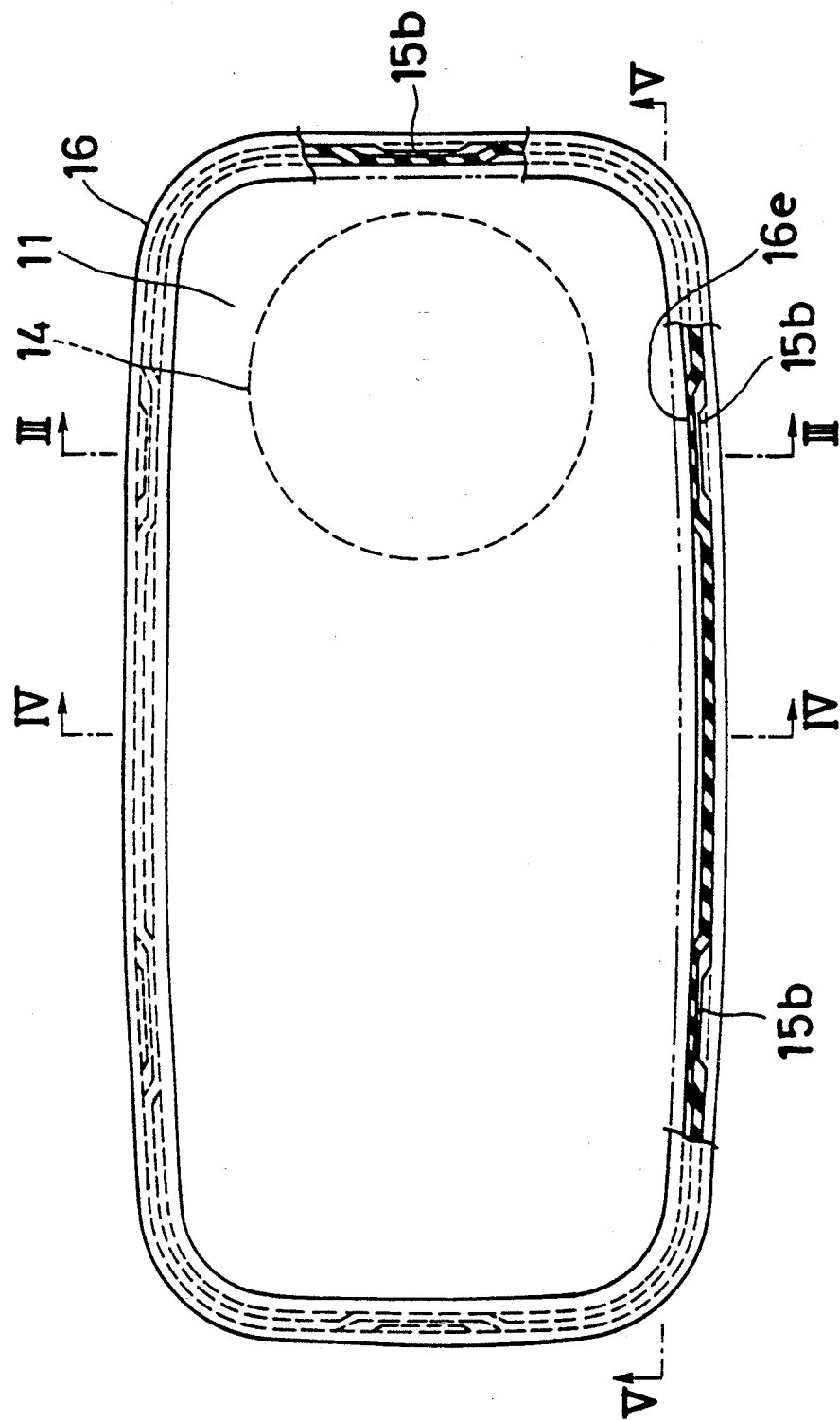
FIG. 1 is a plan view of a mirror device for an automobile according to the present invention.
Figure 2:
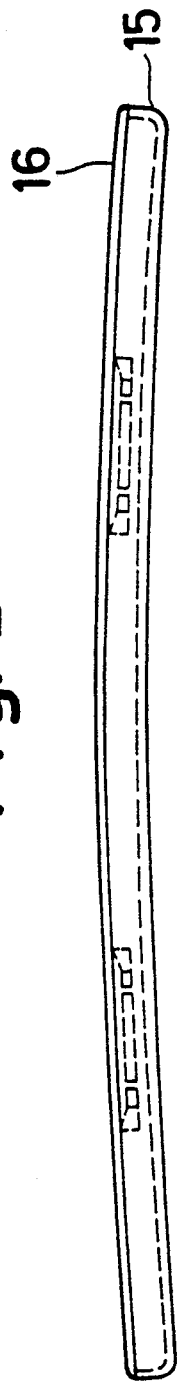
FIG. 2 is a side view of a mirror device for an automobile according to the present invention.
Figure 5:
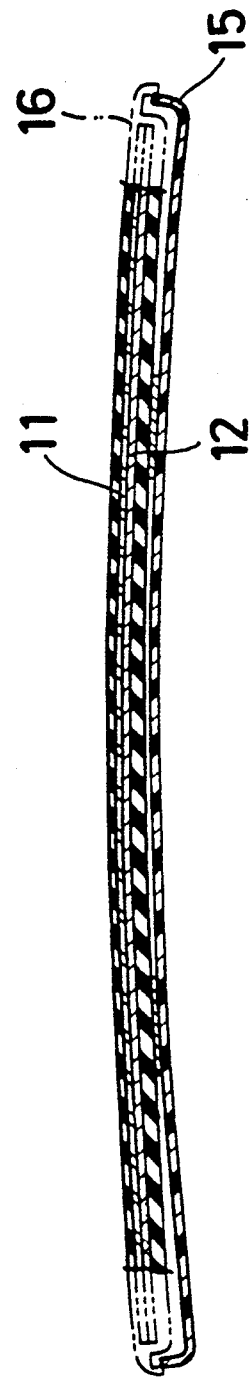
FIG. 5 is a section view taken along the line V—V of FIG. 1.
Figure 3:
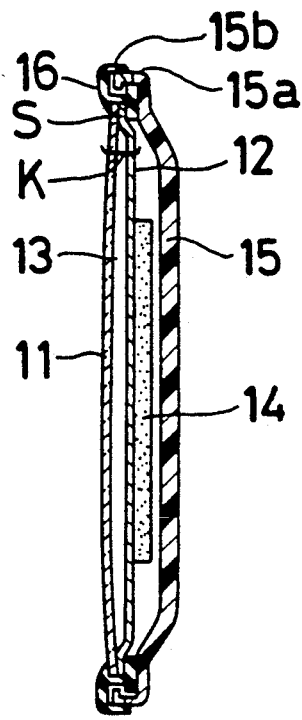
FIG. 3 is a sectional view taken along the line III—III of FIG. 1.
Figure 4:
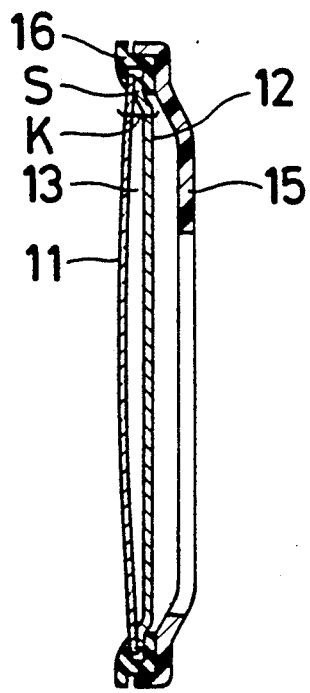
FIG. 4 is a sectional view taken along the line IV—IV of FIG. 1.
Figure 6:
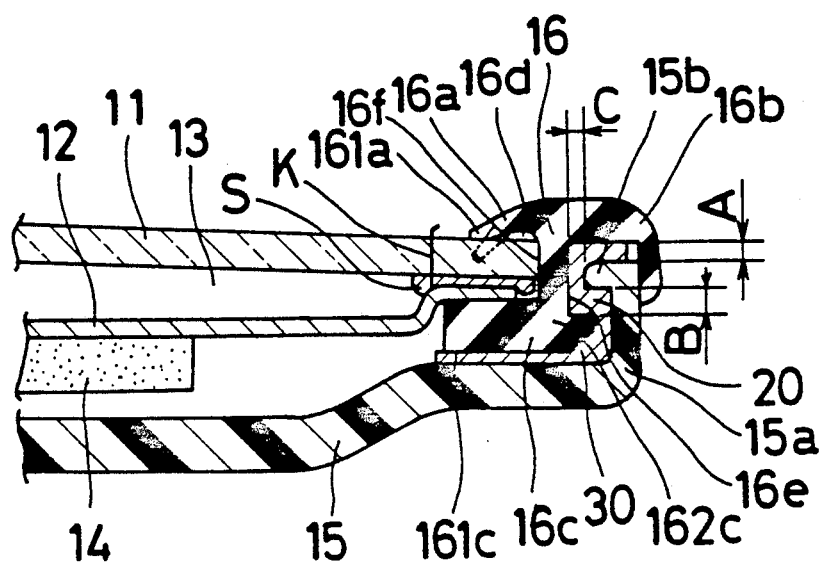
FIG. 6 is a fragmentary enlarged view of FIG. 3.
Figure 7:
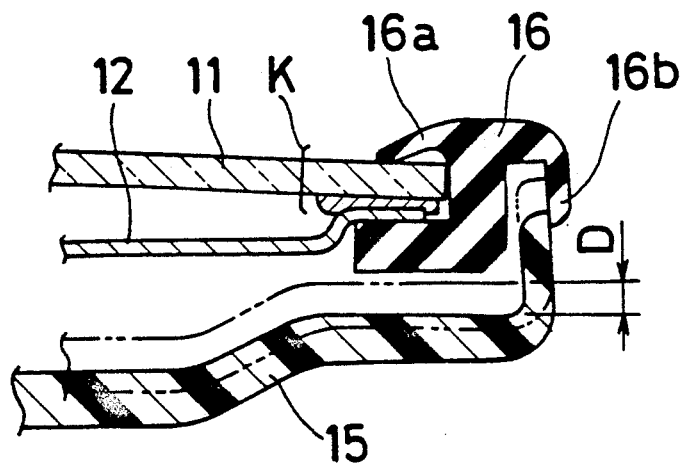
FIG. 7 is a fragmentary enlarged view of FIG. 4.
Figure 8:
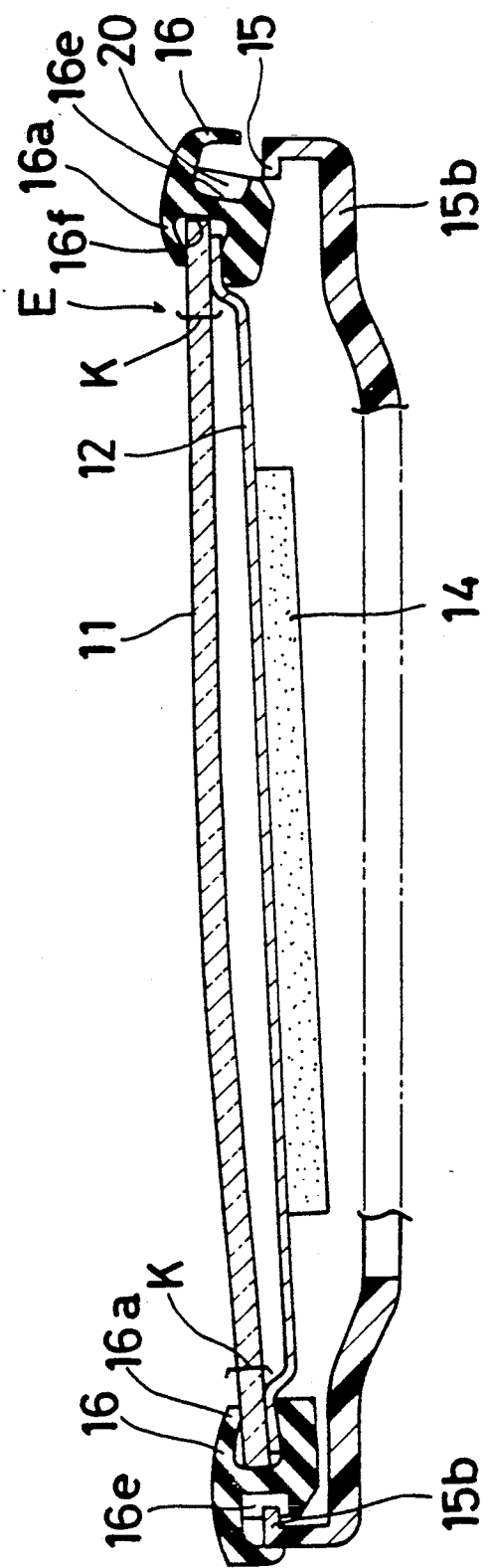
FIG. 8 is an enlarged view which shows an assembled condition of the mirror device.
Figure 9:
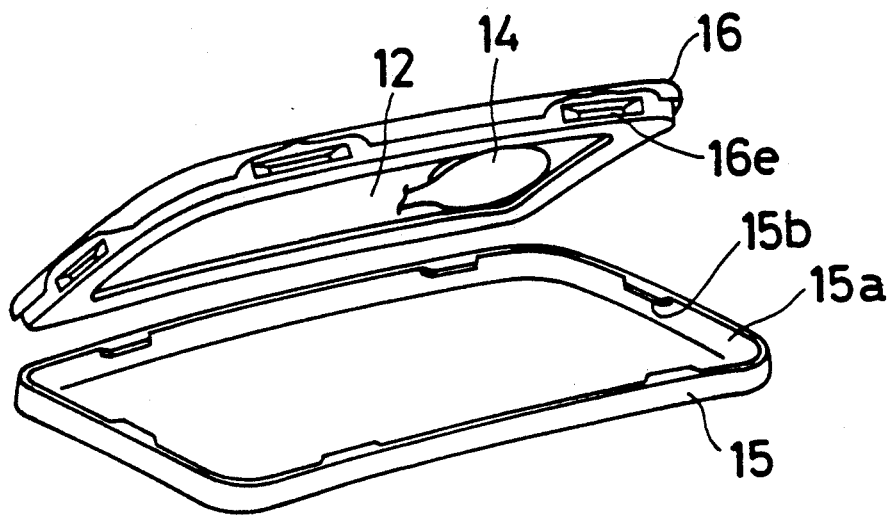
FIG. 9 is an exploded perspective view which shows an assembled condition of the mirror device.
Figure 10:
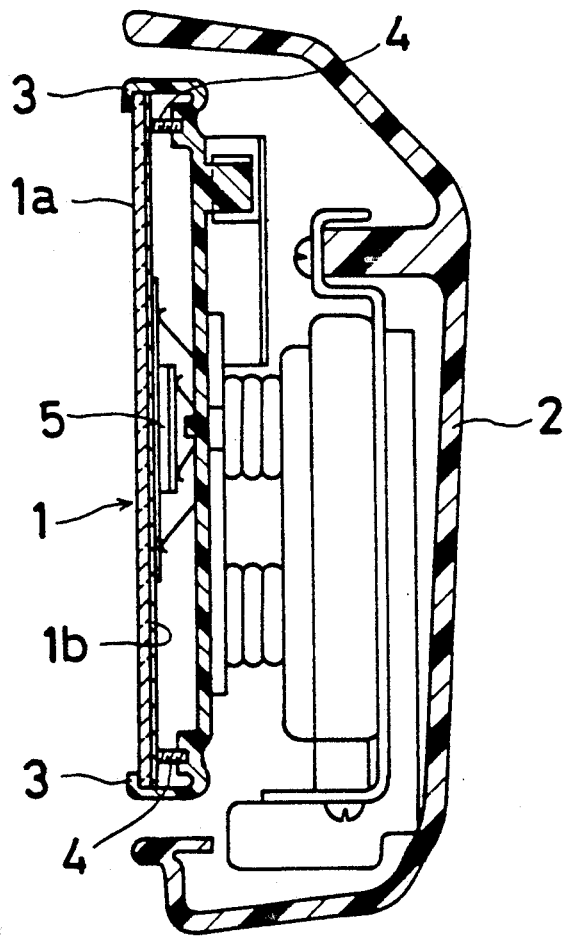
FIG. 10 is a sectional view of a mirror device for an automobile according to the Prior Art.

An embodiment of the present invention will hereinafter be described with reference to FIGS. 1 to 8 inclusive. A mirror 11 has a convex shape. A vibration plate 12 is made of a stainless material. An outer circumferential portion of the vibration plate 12 is formed into a mirror shape by a bending and draw by pressing process. The vibration plate 12 is fixed to a back surface of the mirror 11 adjacent the outer circumference of the vibration plate 12 by an adhesive means S. The adhering portion of the mirror 11 and the vibration plate 12 constitute a held portion K. A space 13 is formed between the mirror 11 and the vibration plate 12 and adjoins the held portion K. A heater is mounted on the back surface of the mirror 11 and disposed in the space 13. The mirror 11 is heated by the heater. A vibrator 14 is provided on a back surface of the vibration plate 12. The vibrator 14 is made of piezoelectric element. A vibrator 14 is connected to an oscillator through a conductive line.

The mirror 11 is vibratably held to a mirror holder 15 at the held portion K through a sealing member 16. The mirror holder 15 is positioned at a reverse side of the mirror 11 and the vibration plate 12.

A bent portion 15a which is bent in a direction toward the front surface of the mirror holder 15 is formed around the entire outer circumferential portion of the mirror holder 15. Six equally spaced convex portions 15b which project inwardly in the direction of the mirror holder 15 are formed at the bent portion 15a. The sealing member 16 is made of an elastic or a soft material. The sealing member 16 is mounted between an outer circumferential portion of the mirror 11 and the bent portion 15a of the mirror holder 15. The sealing member 16 extends along the outer circumferential portion of the mirror 11 and the holder 15. A reverse side of the sealing member 16 has an engaging portion 16c. The engaging portion 16c has an inside engaging portion 161c and an outside engaging portion 162c. The inside engaging portion 161c extends inwardly and opposite the direction of the held portion K. The outside engaging portion 162c projects outwardly opposite to the direction of the convex portion 15b. A lip portion 16a is formed at a front side of the sealing member 16. The lip portion 16a extends over a front side of the mirror 11. A concave portion 16d is formed between the inside engaging portion 161c and lip portion 16a and engages the held portion K. The inside engaging portion 161c contacts the outer circumferential portion of the vibration plate 12 when the concave portion 16d and the held portion K engage each other. Therefore, the mirror 11 is held by the sealing member 16 at the held portion K, and eaves or projecting edge portion 16b is provided along an outer circumferential portion of the sealing member 16 and contacts the bent portion 15a. A fitting portion 16e is formed between the outside engaging portion 162c and the eaves portion 16b and surrounds the convex portion 15b. Therefore, the mirror holder 15 is held by the sealing member 16 at the outer circumferential portion of the mirror holder 15. A bottom wall of the concave portion 16d functions as a holding portion 16f of the mirror 11 and contacts to an edge portion of the mirror 11. The lip portion 16a, the concave portion 16d and inside engaging portion 161c are all situated along the entire length of the held portion K. The eaves portion 16b, the fitting portion 16e and outside engaging portion 162c are situated in an equivalent portion with respect to the convex portion 15b.

A width between the inside engaging portion 161c and a point 161a of the lip portion 16a is more narrow than the width of the concave portion 16d. Therefore, lip portion 16a is pressed against and sticks to the front surface of the mirror 11 along the entire outer circumferential portion of the mirror 11 when holding the mirror 11. As a result no gap is formed between the front surface of the mirror 11 and the seal member 16 adjacent the entire outer circumference portion of the mirror 11.

A space 20 is formed about the convex portion 15b when inserting the convex portion 15b and fitting portion 16e. Space 20 represents a space A, a space B and a space C. The space A is formed between the convex portion 15b and a front wall of the fitting portion 16e. The space B is formed between the convex portion 15b and a back wall of the fitting portion 16e. The space C is formed between the convex portion 15b and a bottom wall of the fitting portion 16e. An adhesive means 30 fills the space 20. A manufacturing tolerance D relating to a design parameter which exists between an amount of curvature of the mirror 11 and a curvature of the mirror holder 15 is absorbed by the adhesive means 30. As a result, A gap is not formed between the front surface of the mirror 11 and the seal member 16 adjacent the entire outer circumferential portion of the mirror 11.

The method of assembly the mirror 11 to the mirror holder 15 is mentioned as follows. The held portion K engages the concave portion 16d. Therefore, the sealing member 16 is held to the mirror 11 at the outer circumferential portion of the mirror 11. Next, the convex portion 15b enters the fitting portion 16e at an upper portion. Therefore, a upper portion of the seal member 16 is assembled on the mirror holder 15. After that, the convex portion 15b enters the fitting portion 16e at a lower portion in the direction E. Therefore, a lower portion of the seal member 16 is assembled on the mirror holder 15. Finally, the adhesive means 30 fills the space 20. Therefore, the seal member 16 is held to the mirror holder 15. As a result, mirror 11 is vibratably held to the mirror holder 15 through a sealing member 16.

The action or operation of the mirror device for an automobile according to the present invention is as follows:

When the vibrator 14 is vibrated by the oscillator, the vibration of the vibrator 5 is transmitted to the mirror 11 through the vibration part 12 and the mirror 11 vibrates. Therefore, water drops which are absorbed on the front surface of the mirror 11, are removed from the front surface of the mirror 11 by misting and dripping instead of collecting between the front surface of the mirror 11 and the seal member 16. Because the lip portion 16a adheres to the front surface of the mirror 11, no gap is formed between the front surface of the mirror 11 and the seal member 16 along the entire outer circumferential portion of the mirror 11. As a result, when the mirror 11 continues vibrating, the water drops do not re-adhere to the mirror. Further, the vibration of the mirror 11 is not obstructed because the mirror 11 is held to the seal member 16 between the held portion K and the concave portion 16d, which portion does not adhere as strongly to the seal member 16. As a result, the transmitting efficiency of the vibrator to the mirror 11 is increased.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes maybe made by those skilled in the art without departing from the spirit of the present invention. Accordingly, the foregoing detailed description should be considered exemplary in nature and not limited to the scope and spirit of the invention as set forth in the appended claims.

What is claimed is:

1. A mirror device for a motor vehicle, comprising:
   a mirror having a front reflecting surface, a back surface, and an outer circumferential portion;
   an elastic seal member mounted to the outer circumferential portion of the mirror, the elastic seal member having circumferential recessed portions defined by spaced walls;
   a holder having a surface area opposing the back surface of the mirror, the holder having circumferential convex portions projecting into and spaced from the walls of the recessed portions;
   solid material filling the space between the walls of the circumferential recessed portions and the convex portion of the holder fixing the holder to the seal member, the mirror being vibratable relative the seal member and the seal member being vibratable relative to the mirror and the holder member; and
   a vibrator mounted to the mirror device for vibrating the mirror.

2. A mirror device for a motor vehicle, comprising:
   a mirror having a front reflective surface, a back surface, and an outer circumferential portion;
   an elastic seal member having a first annular recess defined by a wall and a lip portion normally extending inwardly, the seal member being mounted to the mirror with the outer circumferential portion fitting in the first annular recess deforming the normal position of the lip portion so that the lip portion is constantly urged against the front surface of the mirror adjacent the outer circumferential portion, the elastic seal member having a second circumferential recessed portion defined by spaced walls;
   a holder having a surface area opposing the back surface of the mirror, the holder having circumferential convex portions projecting into and spaced from the walls of the second circumferential recessed portion;
   solid material filling the space between the walls of the second circumferential recessed portion and the convex portion of the holder, fixing the holder to the seal member, the mirror being vibratable relative the seal member and the seal member being vibratable relative to the holder; and a vibrator mounted to the mirror device for vibrating the mirror.

3. A mirror device for a motor vehicle, comprising:

a mirror having a front reflecting surface, a back surface, and an outer circumferential portion;

an elastic seal member having a first annular recess defined by a wall and a concave portion spaced from the wall, the elastic seal member being mounted to the outer circumferential portion of the mirror with the concave portion engaging the reflecting surface of the mirror and the wall being between the mirror and a holder;

the holder having a surface area opposing the back surface of the mirror, the holder having a bent circumferential portion extending substantially at right angles to the wall of the seal member;

the seal member having a projecting edge portion extending in a direction opposite the bent circumferential portion of the holder in engagement with the bent circumferential portion of the holder; and a vibrator mounted to the mirror device for the vibrating the mirror.

4. The mirror device of claim 2 wherein the lip portion of the seal member defining the first annular recess is configured to form a concave portion in the first recess, the wall of the first annular recess being fixed between the seal member and the holder; the holder having a bent portion extending substantially at right angles to the holder's surface area; and the seal member having a projecting portion extending in a direction opposite the bent portion and in engagement with the bent portion of the holder.

5. The mirror device of claim 1 wherein the solid material is an adhesive material.

6. The mirror device of claim 2 wherein the solid material is an adhesive material.

* * * * *